(12) United States Patent
Daily et al.

(10) Patent No.: US 7,235,293 B2
(45) Date of Patent: Jun. 26, 2007

(54) RECYCLABLE CARPET COMPRISING HOT MELT ADHESIVE COMPOSITION

(75) Inventors: Jeffrey Daniel Daily, Hallsville, TX (US); Shannon Lee Van Scoy, Chatsworth, GA (US)

(73) Assignee: Beaulieu Group, LLC, Dalton, GA (US)

( * ) Notice: Subject to any disclaimer, the term of this patent is extended or adjusted under 35 U.S.C. 154(b) by 0 days.

(21) Appl. No.: 10/860,512

(22) Filed: Jun. 3, 2004
(Under 37 CFR 1.47)

(65) Prior Publication Data
US 2005/0064180 A1 Mar. 24, 2005

Related U.S. Application Data

(62) Division of application No. 10/170,276, filed on Jun. 12, 2002, now abandoned.

(60) Provisional application No. 60/298,194, filed on Jun. 14, 2001.

(51) Int. Cl.
B32B 7/12 (2006.01)
B32B 27/32 (2006.01)
B32B 27/34 (2006.01)

(52) U.S. Cl. .............. 428/355 AC; 428/477.7; 428/97; 428/500; 526/935; 524/915

(58) Field of Classification Search ........ 526/935; 428/355 R, 355 AC, 95, 97, 474.4, 477.7, 428/500; 524/915, 487, 556
See application file for complete search history.

(56) References Cited

U.S. PATENT DOCUMENTS

| | | | | |
|---|---|---|---|---|
| 3,390,035 A | | 6/1968 | Sands | |
| 3,423,354 A | * | 1/1969 | Jones | ............ 524/141 |
| 3,583,936 A | | 6/1971 | Stahl | |
| 3,982,051 A | | 9/1976 | Taft et al. | |
| 4,434,261 A | * | 2/1984 | Brugel et al. | ............ 524/109 |
| 4,443,575 A | | 4/1984 | Iwai et al. | |
| 4,939,036 A | * | 7/1990 | Reith | ............ 428/349 |
| 5,240,530 A | | 8/1993 | Fink | |
| 5,300,580 A | | 4/1994 | Wild et al. | |
| 5,445,860 A | | 8/1995 | Bova | |
| 5,500,472 A | | 3/1996 | Liedermooy et al. | |
| 5,534,575 A | | 7/1996 | Foster et al. | |
| 5,624,986 A | * | 4/1997 | Bunnelle et al. | ............ 524/270 |
| 5,763,330 A | | 6/1998 | Bertolucci et al. | |
| 5,928,782 A | | 7/1999 | Albrecht | |
| 5,962,129 A | | 10/1999 | Halloran et al. | |

FOREIGN PATENT DOCUMENTS

EP 0 472 035 A2 2/1991

OTHER PUBLICATIONS

Chiou, et al., "Superplastic Behaviour of a Zirconia Powder-Binder Blend," *Ceramics Int'l* 22:211-17 (1996).
Abstract, Database WPI, Section Ch, week 198901, Derwent Pub. Ltd., JP 63280756 A (Nov. 17, 1998).

* cited by examiner

*Primary Examiner*—Thao Tran
(74) *Attorney, Agent, or Firm*—Sutherland Asbill & Brennan LLP

(57) ABSTRACT

A hot melt adhesive is provided that is useful in the production of textiles, such as a tuft carpet, contains a blend of constituents that allows synthetic carpet members to be fully recycled without first separating the adhesive from the carpet members. The adhesive includes (a) from about 5 to about 30 weight % of a copolymer of an alkyl acrylate having from 2 to 18 carbon atoms; (b) from about 5 to about 50 weight % of a wax and desirably a C10 wax; (c) up to about 75 weight % of a filler; and (d) from about 0.1 to about 10 weight % of an aliphatic carboxylic acid having from 8 to 24 carbon atoms.

12 Claims, No Drawings

RECYCLABLE CARPET COMPRISING HOT MELT ADHESIVE COMPOSITION

CROSS-REFERENCE TO RELATED APPLICATIONS

This is a divisional of U.S. application Ser. No. 10/170,276, filed Jun. 12, 2002, now abandoned. Application Ser. No. 10/170,276 claims benefit of U.S. Provisional Application No. 60/298,194, filed Jun. 14, 2001. These applications are incorporated herein by reference.

BACKGROUND OF THE INVENTION

The present invention relates to a hot melt adhesive composition that is useful in laminating together two or more layers in the preparation of a carpet. More particularly, the present invention relates to a hot melt adhesive composition that may be used in the construction of a multi-layered synthetic carpet that provides for 100% recycling of the carpet.

Hot melt adhesives which are heated to substantially softened and preferably molten state, which are then applied to a substrate and allowed to cool and harden are widely used for industrial purposes. For example, such hot melt adhesives have been used in the manufacture of textiles, such as carpets, personal care products, such as diapers and adult incontinence products in the automobile industry such as bonding headliners.

In the area of textiles, and particularly for the manufacture of carpets, it is becoming increasingly important to recycle the carpet trimmings and rejected materials to reduce the amount of waste that presently has to be disposed of in landfills and to improve the manufacturing economics.

Although the utility of the present adhesive composition will be described as it relates to a carpet textile one skilled in the art will understand that the adhesive composition may be used in other applications where recycling of the material is of importance.

Manufacture of tufted pile carpets normally involves tufting a primary backing followed by washing, dying and drying the tufted backing and then subjecting the same to a finishing operation in which a secondary backing is laminated to a backside of the tufted primary backing.

Tufting usually is accomplished by inserting reciprocating needles threaded with yarn into the primary backing to form tufts of yarn. Loopers or hooks, typically working in timed relationship with the needles, are located such that the loopers are positioned just above the needle eye when the needles are at an extreme point in their stroke through the backing fabric. When the needles reach that point, yarn is picked up from the needles by the loopers and held briefly. Loops or tufts of yarn result from passage of the needles back through the primary backing. This process typically is repeated as the loops move away from the loopers due to advancement of the backing through the needling apparatus.

If desired, the loops can be cut to form a cut pile, for example, by using a looper and knife combination in the tufting process to cut the loops. Alternatively, the loops can remain uncut.

Primary backings for tufted pile carpets are typically woven or nonwoven fabrics made of one or more natural or synthetic fibers or yarns, such as jute, wool, polypropylene, polyethylene, polyamides, polyesters, and rayon. Films of synthetic materials, such as polypropylene, polyethylene and ethylene-propylene copolymers also can be used to form the primary backing.

The tufts of yarn inserted in the tufting process are usually held in place by untwisting of the yarn as well as shrinkage of the backing. In the finishing operation, the backside or stitched surface of the backing usually is coated with an adhesive, also commonly referred to as a backcoat, such as a natural or synthetic rubber or resin latex or emulsion or a hot melt adhesive, to enhance locking or anchoring of tufts to the backing. Use of such backcoats also improves dimensional stability of the tufted carpet, resulting in more durable carpets of improved skid and slip resistance.

Generally, the tufted carpet is further stabilized in the finishing operation by laminating a secondary backing, for example a thermoplastic film or a woven or nonwoven fabric made from polypropylene, polyethylene, or ethylene-propylene copolymers or natural fibers such as jute, to the tufted primary backing. The adhesive used in the finishing operation bonds the primary backing to the secondary backing.

In carpet lamination processes, basic requirements for adhesives include ability to bond strongly to the primary backing and bond to the tuft stitches protruding through its backside and the secondary backing. In particular, ability to adhere to nylon and polypropylene is important because the combination of these materials (polypropylene backing fabrics and nylon face yarns) accounts for a large percentage of carpet manufactured at present. Activation temperature of a hot melt adhesive, that is, temperature at which the adhesive softens and flows sufficiently to wet and penetrate the backing surfaces and tuft stitches, must be below the temperature at which the backing and face yarns melt or suffer other damage due to heating, for example, relaxation of oriented polyolefin yarns in the backings. Adhesives also must have a low enough viscosity at temperatures employed in finishing to achieve good wetting of the backings and sufficient encapsulation of tuft stitches to make the tuft yarns resistant to pull-out, pilling and fuzzing. In addition, for commercial practice, economics of a carpet manufacturing process utilizing hot melt adhesive must be at least as good as those of conventional latex lamination techniques which remain the dominant lamination process in commercial carpet manufacture.

A number of hot melt adhesives and processes using the same have been proposed for use in carpet lamination. For example, U.S. Pat. No. 3,583,936 to Stahl discloses a hot melt adhesive having: (1) from about 10-35 weight % ethylene copolymer having about 60-85 weight % ethylene units and about 40-15 weight % lower vinyl ester, acrylate, or methacrylate units; (2) about 10-25 weight % of a wax component having a melting point sufficient to give an adhesive composition with a softening point greater than 190° F.; and (3) about 50-70 weight % of a resin extender that is a blend of (a) an aliphatic thermoplastic hydrocarbon resin that is substantially free of polymerized aromatics prepared from diene and olefin monomers of 5 to 7 carbon atoms and (b) a polymer resin derived from the alkylation of aromatic compounds with dicyclopentadiene and having a softening point of about 40° F.-105° F.

U.S. Pat. No. 3,982,051 to Taft et al. discloses a hot melt adhesive for carpet lamination having consisting essentially of: (1) from about 5% to about 50% by weight of a copolymer of ethylene and unsaturated ester monomer selected from the group consisting of vinyl acetate; alkyl acrylate wherein the alkyl group contains 1-18 carbon atoms; and mixtures thereof; containing from about 40 to 85% by weight of ethylene and from about 15 to about 60% by weight of unsaturated ester monomer; (2) from about 10 to about 85% by weight of an atactic polypropylene; and (3)

from about 10 to about 50% of vulcanized rubber, wherein the composition is based upon the combined weight of (1), (2), and (3).

U.S. Pat. No. 3,551,231 to Smedberg discloses a hot melt adhesive carpet lamination process in which molten adhesive consisting of an ethylene-vinyl acetate copolymer and, optionally, waxes (e.g., microcrystalline and polyethylene waxes), fillers (e.g., calcium carbonate), resin extenders (e.g., dicyclopentadiene alkylation polymers) and antioxidant is applied to a tufted primary backing and then a secondary backing is contacted with the so-applied, molten adhesive under pressure after which the assembly is cooled to solidify the adhesive.

U.S. Pat. No. 4,939,036 to Reith discloses a hot melt adhesive composition having about 25 to about 40 weight percent of a polyethylene having a melt index of about 15 to about 30 grams per ten minutes; about 25 to about 40 weight percent of a polyterpene resin having a ring and ball softening point of about 90° C. to about 105° C., about 10 to about 20 weight percent of a paraffin wax having a melting point of about 140° F. to about 165° F., about 10 to about 20 weight percent polybutene having a viscosity of about 500 to about 5000 centistokes at 210° F. and up to about 1 weight percent antioxidant.

Although the aforementioned hot melt adhesives may be used for carpet lamination, it is desired in the textile industry to create products that are 100 percent recyclable with minimum difficulty. Accordingly, there remains a need for a hot melt adhesive carpet lamination process that will provide tufted carpets of good bond strength between primary and secondary backings as well as allow for the carpet to be recycled without physically separating the bonding materials before recycling the carpet material.

SUMMARY OF THE INVENTION

Surprisingly, it has been found that a hot melt adhesive based on copolymers of ethylene and methyl acrylate have good heat resistance while maintaining excellent flexibility and permit the carpet to be 100% recyclable.

In one aspect, a hot melt adhesive composition is provided having from about 5 to about 30 weight % of at least one copolymer of an alkyl acrylate having from 2 to 18 carbon atoms; from about 5 to about 50 weight % of a wax; up to about 70 weight % of a filler; and from about 0.1 to about 10 weight % of an aliphatic carboxylic acid having from 8 to 24 carbon atoms.

In another aspect, a multi-layered laminated article is provided, such as a synthetic carpet, having a first layer comprising polypropylene or a polyamide and a second layer comprising the adhesive composition above.

DETAILED DESCRIPTION OF THE INVENTION

Advantageously, the adhesive composition of the present invention allows 100% of the polymeric product to be recycled and provides a water-resistant bond. The adhesive composition includes from about 5 to about 30 weight % of at least one copolymer of an alkyl acrylate having from 2 to 18 carbon atoms; from about 5 to about 50 weight % of a wax; up to about 70 weight % of a filler; and from about 0.1 to about 10 weight % of an aliphatic carboxylic acid having from 8 to 24 carbon atoms. Desirably, the adhesive composition includes from about 5 to 20 weight % of a copolymer of an alkyl acrylate having from 2 to 18 carbon atoms which preferably is selected from ethylene (meth) acrylate, methyl (meth) acrylate, propyl acrylate, butyl acrylate, hexyl acrylate, 2-ethylhexyl acrylate, dodecyl acrylate, lauryl acrylate, stearyl acrylate and mixtures thereof. As used herein, (meth) acrylates includes both acrylates and methacrylates. Preferably, the adhesive includes from about 5 to 15 weight % of ethylene and/or methyl (meth)acrylate copolymer.

The copolymers of the alkyl acrylates and preferably ethylene and methyl (meth)acrylate useful herein are those having from about 10% to about 40% by weight methyl (meth)acrylate, preferably from about 15% to about 30% by weight, and most preferably from about 20% to about 30% by weight, and a melt index of less than about 1500 g/10 min., preferably less than about 1000 g/10 min. and most preferably less than about 500 g/10 min. Polymers with lower melt indices provide better heat resistance and better tensile strength provided a low enough viscosity is maintained. These copolymers are available from Exxon Chemical Co. under the tradename of OPTEMA. Some available grades are TC-140, XS-93.04 and TC-221. They are also available from Elf Atochem North America under the tradename of LOTRYL. Some available grades are 9 MA 02, 14 MG 02, 15 MA 03, 16 MA 003, 18 MA 02, 18 MG 02, 20 MA 08/20 MB 08, 24 MA 005, 28 MA 07, 28 MA 175, 29 MA 03 and 35 MA 05. Other sources include EMAC available from Eastman Chemical Company. One such grade is SP 2220X which has 20 weight % methyl acrylate and a melt index of 20 g/10 min. Even though acrylates are preferred, methacrylate copolymers are also contemplated for use in the compositions and structures.

The lower alkyl acrylates may additionally contain from 0 to about 3 weight % of other polymerizable monomers, such as acrylic acid, methacrylic acid, itaconic acid, acrylamide, beta dimethylaminoethyl methacrylate, beta hydroxyethyl acrylate, diallyl maleate, diallyl phthalate, diallyl ether or ethylene glycol dimethacrylate.

The waxes useful in the adhesive composition of the present invention include waxes having from 6 to 20 carbon atoms, preferably from 6 to 15 carbon atoms and most preferably from 8 to carbon atoms. Suitable waxes include paraffin waxes, microcrystalline waxes, high density low molecular weight polyethylene waxes, by-product polyethylene waxes, Fischer-Tropsch waxes, oxidized Fischer-Tropsch waxes, and hydroxy stearamide waxes. Other functional waxes are available as well as other fatty amide waxes. It is common in the art to use the terminology synthetic high melting point waxes which includes high density low molecular weight polyethylene waxes, by-product polyethylene waxes, and Fischer-Tropsch waxes.

The paraffin waxes useful herein are those having a Ring and Ball softening point of about 55° C. to about 85° C. The preferred waxes are Okerin™ 236TP available from Astor Wax Corporation located in Doraville, Ga.; Penreco™ 4913 available from Pennzoil Products Co. in Houston, Tex.; R-7152 Paraffin Wax available from Moore & Munger in Shelton, Conn.; and Paraffin Wax 1297 available from International Waxes, Ltd in Ontario, Canada.

The microcrystalline waxes useful herein are those having about 50% by weight or more cyclo or branched alkanes with a length of between about 30 and 100 carbons. They are generally less crystalline than paraffin and polyethylene waxes, and have melting points of greater than about 70° C. Examples include Victory™ Amber Wax, a 70° C. melting point wax available from Petrolite Corp. located in Tulsa, Okla.; Bareco™ ES-796 Amber Wax, a 70° C. melt point wax available from Bareco in Chicago, Ill.; Okerin™ 177, an 80° C. melt point wax available from Astor Wax Corp.; Besquare™ 175 Amber Wax, an 80° C. melt point microcrystalline wax, Be Square™ 195 Amber Wax, a 90° C. melt point wax all available from Petrolite Corp.; Indramic™ 91, a 90° C. melt point wax available from Industrial Raw Materials located in Smethport, Pa.; and Petrowax™ 9508 Light, a 90° C. melt point wax available from Petrowax Pa., Inc. located in New York, N.Y.

The synthetic high melting point waxes useful herein are high density, low molecular weight polyethylene waxes preferably having from 6 to 15 carbon atoms, by-product polyethylene waxes and Fischer-Tropsch waxes. Preferred waxes include EPOLENE C10 available from Eastman Chemical Company, PETROLITE C-4040, POLYWAX 1000, 2000 and 3000, low molecular weight polyethylene waxes available from Petrolite Corp.; ESCOMER H-101, a modified polyethylene wax available from Exxon Chemical Co.; Marcus 100, 200 and 300, low molecular weight by-product polyethylene waxes available from Marcus Chemical Co., a Division of H.R.D. Corp. located in Houston, Tex.; and PARAFLINT H-1, H-4 and H-8, Fischer-Tropsch waxes available from Sasol-SA/Moore & Munger in Shelton, Conn.

The waxes are useful in amounts from about 5 to about 50 weight %, preferably from about 10 to about 40 weight % and most preferably from about 15% to about 25 weight % in the adhesive, and may be used in any combination. One skilled in the art would recognize that different amounts of a wax will be used depending on the type of wax and the specific application, and that different combinations of waxes will also affect the amount of wax desired.

Fillers which may be used include calcium carbonate, clay, magnesium carbonate, calcium sulfate, alumina, talc, barium sulfate, silica, carbon black, aluminum hydroxide, magnesium hydroxide and other various finely divided organic and other inorganic materials or fibers, and mixtures of the above, to reduce cost and increase viscosity of hot melt adhesive. Filler content of the adhesive composition is used according to this invention can be varied to achieve compositions of desired viscosity but typically up to about 75 weight % of the total composition. Preferably, the filler is from about 15 to about 70 weight % and more preferably from about 25 to about 65 weight % of the total composition.

The fourth component of the adhesive is an aliphatic carboxylic acid having from 8 to 32 carbon atoms and preferably from 12 to 18 carbon atoms. The amount of aliphatic carboxylic acid added to the adhesive is from about 0.1 to about 10 weight % of the total composition, and preferably from about 1 to about 5 weight %.

In addition to the above components, the hot melt adhesive may include up to about 4 weight % of other additives to impart desired properties. For example, antioxidants, plasticizers, tackifiers, flame retardants, and colorants. The adhesive composition may also include a foaming agent capable of releasing a gas at a temperature above the activation temperature of the adhesive but below the finishing temperature to reduce the amount of adhesive necessary for forming the bond.

Suitable antioxidants include high molecular weight hindered phenols and multifinctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include 1,3,5-trimethyl 2,4,6-tris(3,5-di-tert-butyl-4-hydroxybenzyl)benzene; pentaerythrityl tetrakis-3(3,5-di-tert-butyl-4-hydroxyphenyl)propionate; n-octadecyl-3(3,5-di-tert-butyl-4-hydroxyphenyl)propionate; 4,4'-methylenebis(2,6-tert-butylphenol); 4,4'-thiobis(6-tert-butyl-o-cres-ol); 2,6-di-tertbutylphenol; 6-(4-hydroxyphenoxy)-2,4-bis(n-octyl-thio)-1,3,5-triazine; di-n-octylthio)ethyl 3,5-di-tert-butyl-4-hydroxy-benzoate; and sorbitol hexa(3-(3,5-di-tert-butyl-4-hydroxyphenyl)-propionate).

The performance of these antioxidants may be further enhanced by utilizing, in conjunction therewith known synergists such, for example, as thiodipropionate esters and phosphites, particularly useful is distearylthiodipropionate. These stabilizers, if used, are generally present in amounts of about 0.1 to 1.5 weight percent, preferably 0.25 to 1.0%. Other additives such as plasticizers, pigments, dyestuffs conventionally added to hot melt adhesives for various end uses contemplated as well as small amounts of additional tackifiers and/or waxes such as paraffin wax may also be incorporated in minor amounts, i.e., up to about 10% by weight, into the present formulations.

Plasticizers that may be included in the present adhesive composition may be liquid or solid, depending on properties sought. Solid plasticizers with increased softening points of (60-130° C.) can aid in improving heat resistance or preventing bond failure at high temperatures. One useful class of plasticizers are cycloaliphatic and/or aromatic ester of a benzene dicarboxylic acid. Such plasticizers are prepared by forming an ester from an aliphatic or aromatic alcohol, or mixtures of such alcohols, such as 2-ethylhexanol, cyclohexanol, phenol, naphthol, or other monohydroxy alcohol compounds having from 5 to 12 carbon atoms. The ester compounds are formed from dicarboxylic acid compounds, typically phthalic acids. Phthalic acids that can be used in the plasticizers are 1,2-benzene dicarboxylic acid, 1,3-benzene dicarboxylic acid (isophthalic acid), or 1,4-benzene dicarboxylic acid (terephthalic acid). Such plasticizers of this class include dioctyl phthalate, butyl benzyl phthalate, dicyclohexyl phthalate and diphenyl phthalate.

Other suitable plasticizers include an aromatic carboxylic acid ester of a polyfunctional alcohol having 2 to 10 hydroxyl groups. Polyfunctional alcohols that can be used in the compositions of this class of plasticizers include compounds having at least two hydroxyl groups and at least two carbon atoms in the molecule. Specific examples of preferred hydroxy compounds include ethylene glycol, propylene glycol, 1,2-butylene glycol, 1,4-butylene glycol, glycerine, glucose, fructose, sucrose, mannitol, trimethylolethane, 1,4-cyclohexanedimethanol, pentaerythritol, 2,2-dimethyl-1,3-propanediol, 2-hydroxymethyl-2-methyl-1-, 3-propanediol, neopentyl glycol, and other useful polyfunctional hydroxyl compounds. Aromatic acids that can be used with the polyfunctional alcohols to form this class of ester plasticizer compounds include aromatic carboxylic acids, typically having at least one aromatic group and at least one carboxyl function. Representative acids include benzoic acid, naphthionic acid, and 4-methyl benzoic acid. Typical examples of such useful plasticizers include ethylene glycol dibenzoate, propylene glycol dibenzoate, trimethylene glycol tribenzoate, trimethylol ethane tribenzoate, glycerol tribenzoate, sucrose benzoate, pentaerythritol tetrabenzoate, 2,2-dimethyl-1,3-propanediol dibenzoate, trimethylene glycol dibenzoate, glycerol tribenzoate, 2-hydroxymethyl-2-methyl-1,3-propanedioltribenzoatepentaerythritoltetraben zoate, neopentyl glycol dibenzoate, mixtures thereof, and others. A preferred plasticizer is a solid with a softening point above 60° C. which belongs to the class of plasticizers including cyclohexane dimethanol dibenzoate compounds. A 1,4-cyclohexane dimethanol dibenzoate (containing cis-and trans-isomers) is exemplified and produces the maximum control over variation and change in adhesive physical properties.

Tackifiers that may be added to the adhesive composition may be rosin derivatives (including wood rosin, tall oil, tall oil derivatives, rosin ester rosins, etc.), aliphatic resins such as natural and synthetic terpenes, and aromatic or mixed aromatic-aliphatic tackifying resins.

Representative examples of rosin include gum rosin, wood rosin, and tall oil rosin. Representative examples of rosin derivative tackifying resins include the pentaerythritol esters of tall oil, gum rosin, wood rosin and mixtures thereof.

Aliphatic monomers are typically natural and synthetic terpenes which contain $C_5$ and $C_6$ cyclohexyl or cyclopentyl saturated groups that can additionally contain a variety of substantially aliphatic ring substituents. Aliphatic tackifying resins can be made by polymerizing a feed stream containing sufficient aliphatic monomer such that the resulting resin exhibits aliphatic characteristics. Such feed streams can contain other aliphatic unsaturated monomers such as 1,3-butadiene, cis-1,3-pentadiene, trans-1,3-pentadiene, 2-methyl-1,3-butadiene, 2-methyl-2-butene, cyclopentadiene, dicyclopentadiene, terpene monomers, and others. Mixed aliphatic-aromatic resins contain sufficient aromatic monomers and sufficient aliphatic monomers and optionally other $C_3$-$C_8$ unsaturated monomers to produce a resin having both aliphatic and aromatic character.

Specific examples of other tackifying resins which may be employed in the formulations of the invention include EASTOTAC H-100, H-115 and H-130 from Eastman Chemical Co. in Kingsport, Tenn. which are partially hydrogenated cycloaliphatic petroleum hydrocarbon resins with different softening points. These are available in E grade, R grade, L grade, and W grade. These have differing levels of hydrogenation from least hydrogenated (E) to most hydrogenated (W). The E grade has a bromine number of 15, the R grade a bromine number of 5, the L grade has a bromine number of 3, and the W grade has a bromine number of 1. There is also an EASTOTAC H-142R resin available. Other useful tackifying resins include ESCOREZ 5300 and ESCOREZ 5400, partially hydrogenated cycloaliphatic petroleum hydrocarbon resins, and ESCOREZ 5600, a partially hydrogenated aromatic modified petroleum hydrocarbon resin all available from Exxon Chemical Co. in Houston, Tex.; WINGTACK Extra which is an aliphatic, aromatic petroleum hydrocarbon resin available from Goodyear Chemical Co. in Akron, Ohio; HERCOLITE 2100 which is a partially hydrogenated cycloaliphatic petroleum hydrocarbon resin available from Hercules in Wilmington, Del.; and ZONATAC 105 Lite which is a styrenated terpene resin made from d-limonene and available from Arizona Chemical Co. in Panama City, Fla.

The present compositions may be blended with a mixer such as a kneader, Brabender mixer, Banbury mixer, and a single or double screw extruder. The blending with the mixer may be conducted by adding thereto each compound component. The order of adding the components to the mixer is not restricted. Generally, no external heat is required to be added to the mixture and only the heat from mixing is used to blend the components. The heating temperature may range from 100 to 200° C. and preferably is from 110 to 180° C., and a period of time required for the blending may range from 5 to about 40 minutes and preferably from 8 to 30 minutes, whereby a sufficiently homogeneous mixture can be obtained.

The resultant composition can then be extruded and formed into powders, pellets, film, sheets, and the like. The adhesive composition in the form of pellets may be applied to the carpet backing by first extruding the pellets with an extruder, or the like, into a sheet or a film, so that it may then be backed by laminating the sheet or the film onto the carpet base material with an adhesive or by heating.

Alternatively, the composition may be extruded immediately after blending in the form of a film or a sheet directly onto the carpet base material thereby being processed directly to back the carpet base material.

Typically, in applying the adhesive to a carpet backing, the substrate and composite hot melt adhesive are heated in contact to activate the adhesive with application of pressure sufficient to press the backing surfaces into the activated adhesive and cause tuft stitch encapsulation. Heating is at a temperature at least equal to that at which the adhesive composition activate but below the temperature at which the backings and face yarns suffer damage, e.g., melting or loss of orientation, due to heating. With polypropylene backings and face yarns of polypropylene or higher melting yarns such as polyamides (Nylon), heating preferably is at a temperature such that the interior of the carpet structure does not exceed about 300° F. (about 150° C.). More preferably, interior temperatures during lamination range from about 240° F. to about 290° F. (116° C.-144° C.).

Application rates of the hot melt adhesive are sufficient to provide good encapsulation and strength without waste of the adhesive or oozing thereof through the primary backing and into the face yarns protruding from the face surface of the backing. Precise application rates can vary considerably depending on carpet style. For carpet styles that are roughly representative of the middle of the spectrum of carpet styles in terms of stitch density, face yarn and backing characteristics, about ½ to about 4 pounds (0.227 kg/m$^2$ to about 1.8 kg/m$^2$) of adhesive is applied per square yard of carpet (lbs/yd$^2$). Acceptable results with such carpet types are achieved at application rates of about 0.8 to about 3 lbs/yd$^2$ (0.3 kg/m$^2$ to about 1.1 kg/m$^2$), and most preferably about 0.8 to about 1.5 lbs/yd$^2$ (0.3 kg/m$^2$ to about 0.6 kg/m$^2$).

Pressure is applied to press the backings into the activated adhesive and promote tuft encapsulation, but is not so high as to damage the face yarns of the carpet. When heating with a drum laminator, a continuous belt can be used to apply pressure to the contacted backings and adhesives. It also is contemplated to pass the contacted backings and adhesives between pressure or nip rolls while the adhesive is activated to apply the desired pressure. When using such rolls, preferred pressures range from about 7 to about 12 pounds per linear inch of carpet.

Any suitable apparatus for conducting such lamination can be employed in the methods of using the present compositions. For example, backings and composite adhesive in sheet form can be supplied from feed rolls to and over a hot drum laminator comprising a heated drum. As noted above, pressure rolls or a continuous belt can be used to apply pressure to the carpet assembly. Typically, the backings contact the drum such that the secondary backing is in contact with the drum, thereby avoiding potential damage to face yarns due to prolonged contact between the same and the heated surface of the drum. Conventional drying and curing ovens of the type used in latex adhesive lamination processes also can be used, the contacted backings and composite adhesive being passed through with a revolving tenter frame or over rolls or other suitable means. Cooling of the carpet structure can be accomplished by any suitable means, for example by simply passing the carpet structure into an ambient temperature zone or with chill rolls.

The resulting carpet structure can be subjected to post-finishing operations as desired as is known in the carpeting art.

It is also to be understood, unless otherwise noted herein, that the present carpet backing adhesive hot melts can be employed as adhesives for articles other than carpets such as for paper articles, plastics, metals, and the like.

The present invention is illustrated in greater detail by the specific and non-limiting examples presented below.

EXAMPLE 1

An adhesive composition was compounded using Farrel continuous mixer having a six (6) inch rotor and having tempered water at 65° F. circulated through the mixer body and rotor was used as a mixing vessel. In making the adhesive blend of the present invention, about 200 lbs/hr (90.8 kg/hr) of ethylene (meth)acrylate having 20 weight % methyl acrylate and a melt index of 20 g/10 minutes (SP 2220 X available from Eastman Chemical Company); about 1240 lbs/hr (563 kg/hr) of calcium carbonate as a filler; about 496 lbs/hr (225 kg/hr) of a EPOLENE C10 wax; and about 60 lbs/hr (27.2 kg/hr) of Hystrene stearic acid was added to the mixer and stirred at 350 rpm until the components were fully molten to temperature of about 250-300° F. (121-149° C.) and blended. The contents were forced through an orifice opening of about 1 inch into an extruder. The resulting pellets were withdrawn and packaged. The final composition of the adhesive was about 10 weight % ethylene methylacrylate; about 25 weight % wax; about 62 weight % filler; and about 3 weight % stearic acid.

This adhesive was then melt extruded onto a 5 tuft substrate carpet backing with an add-on of about 0.7 lb/yd$^2$ (0.3 kg/m$^2$). The adhesive had good penetration on a 5 tuft carpet. The carpet tuft bond as measured by ASTM D 1335 was greater than 11 pounds. A VELCRO™ test was performed to determine the number of fibers removed. In performing the VELCRO™ test, a roller about 3 inches (7.6 cm) wide, about 2 inches (5.0 cm) in diameter and weighing about 2 lbs (about 900 grams) has the exterior surface area covered with a hook type material, such as VELCRO™. The roller is moved up and down (one cycle) a piece of carpet approximately 12 inches wide by 18 inches long (30 cm×46 cm). After 10 cycles, the number of fibers removed from the carpet and adhered to the roller was observed. The carpet was then ranked from 1 (unacceptable) to 5 (acceptable) based upon the number of fibers removed. The VELCRO™ test was 5. The resultant carpet backing was flexible, resistant to water penetration, and would not delaminate.

EXAMPLE 2

A second adhesive composition was prepared as described above except that 200 lbs/hr (90.8 kg/hr) of ethylene (meth)acrylate SP2220X; about 1240 lbs/hr (563 kg/hr) of Hymag 7030-3 as a filler (2:1 weight ratio of CaCO$_3$: MgOH); about 496 lbs/hr (225 kg/hr) of a EPOLENE C10 wax; and about 60 lbs/hr (27.2 kg/hr) of Hystrene stearic acid; and 4 lbs/hr (1.5 kg/hr) of a colorant were blended in the mixer described above. The resulting pellets were withdrawn and packaged. The final composition of the adhesive was about 10 weight % ethylene methylacrylate; about 24.8 weight % of a wax; about 62 weight % of a filler; and about 3 weight % of stearic acid and about 0.2 weight % of the colorant.

This adhesive was then melt extruded onto a 5 tuft substrate carpet backing with an add-on of about 1 lb/yd$^2$ (0.4 kg/m$^2$). The carpet had a tuft bond greater than 11 pounds and had a VELCRO™ test of 5, was flexible, resistant to water penetration and would not delaminate.

COMPARATIVE EXAMPLE 1

A comparative adhesive was prepared using the procedures described above except that 200 lbs/hr of ethylene (meth)acrylate SP2220X; about 1300 lbs/hr of calcium carbonate as a filler; and about 500 lbs/hr of a EPOLENE C10 wax were blended together. The resulting pellets were withdrawn and packaged. The final composition of the adhesive was about 25 weight % wax, about 65 weight % filler, and about 10 weight % ethylene (meth)acrylate.

This adhesive was then melt extruded onto a 5 tuft substrate carpet backing with an add-on of about 1.0 lb/yd$^2$ (0.4 kg/m$^2$). The adhesive penetration was poor. The VELCRO™ test was 4.5. The composition was not acceptable as a carpet adhesive.

COMPARATIVE EXAMPLE 2

A second comparative adhesive was prepared in accordance with the procedure of Comparative Example 1 above except the final composition of the adhesive was 35 weight % wax, 50 weight % filler, and 15 weight % ethylene (meth)acrylate.

This adhesive was then melt extruded onto a 5 tuft substrate carpet backing with an add-on of about 0.75 lb/yd$^2$ (0.3 kg/m$^2$). The adhesive penetration was poor. The VELCRO™ test was 4.5. The composition was not acceptable as a carpet adhesive.

COMPARATIVE EXAMPLE 3

A third comparative adhesive composition was prepared in accordance with the procedure of Comparative Example 1 above except the final composition of the adhesive was 42 weight % wax, 30 weight % filler, and 28 weight % ethylene (meth)acrylate.

This adhesive was then melt extruded onto a 5 tuft substrate carpet backing with an add-on of about 1.0 lb/yd$^2$ (0.4 kg/m$^2$). The adhesive penetration was poor and the carpet was stiff. The VELCRO™ test was 4.5. The composition was not acceptable as a carpet adhesive.

Patents and other publications cited herein and the materials for which they are cited are specifically incorporated by reference. Modifications and variations of the methods and devices described herein will be obvious to those skilled in the art from the foregoing detailed description. Such modifications and variations are intended to come within the scope of the appended claims.

We claim:
1. A multi-layer laminated article comprising:
    a first layer selected from the group consisting of polypropylene and polyamides; and
    a second layer comprising a hot melt adhesive composition which comprises:
        i) from about 5 to about 30 weight % of at least one copolymer of an alkyl acrylate selected from the group consisting of methyl acrylate, ethylene (meth)acrylate, propyl acrylate, butyl (meth)acrylate, hexyl acrylate, 2-ethylhexyl acrylate, dodecyl acrylate, lauryl acrylate, stearyl acrylate and mixtures thereof;
ii) from about 5 to about 50 weight % of a wax having from 6 to 20 carbon atoms;
iii) up to about 75 weight % of a filler; and
iv) from about 0.1 to about 10 weight % of an aliphatic carboxylic acid having from 8 to 32 carbon atoms.

2. The multi-layer laminated article of claim 1, wherein said wax is selected from the group consisting of paraffin waxes, microcrystalline waxes, high density low molecular weight polyethylene waxes, by-product polyethylene waxes, Fischer-Tropsch waxes, oxidized Fischer Tropsch waxes, hydroxy waxes, stearamide waxes, and mixtures thereof.

3. The multi-layer laminated article of claim 1, wherein said filler is from about 25 to 65 weight % of the composition and is selected from the group consisting of calcium carbonate, clay, magnesium carbonate, calcium sulfate, alumina, talc, barium sulfate, silica, carbon black, aluminum hydroxide, magnesium hydroxide, and mixtures thereof.

4. The multi-layer laminated article of claim 1, wherein said carboxylic acid has from 12 to 18 carbon atoms.

5. A recyclable carpet comprising:
a first layer selected from the group consisting of polypropylene and polyamides; and
a second layer comprising a hot melt adhesive composition which comprises:
i) from about 5 to about 30 weight % of at least one copolymer of an alkyl acrylate selected from the group consisting of methyl acrylate, ethylene (meth)acrylate, propyl acrylate, butyl (meth)acrylate, hexyl acrylate, 2-ethylhexyl acrylate, dodecyl acrylate, lauryl acrylate, stearyl acrylate and mixtures thereof;
ii) from about 5 to about 50 weight % of a wax having from 6 to 20 carbon atoms;
iii) up to about 75 weight % of a filler; and
iv) from about 0.1 to about 10 weight % of an aliphatic carboxylic acid having from 8 to 32 carbon atoms.

6. The recyclable carpet of claim 5, wherein said wax is selected from the group consisting of high density low molecular weight polyethylene waxes, and by-product polyethylene waxes having from 6 to 15 carbon atoms, from about 25 to 65 weight % filler, and said aliphatic carboxylic acid is from about 1 to about 5 weight % stearic acid.

7. The recyclable carpet of claim 5, further comprising tufts of yarn secured into the first layer.

8. A carpet comprising:
a first layer selected from the group consisting of polypropylene and polyamides; and
a second layer laminated to the first layer and comprising a hot melt adhesive composition which comprises:
i) between 5 and 30 weight % of at least one copolymer of an alkyl acrylate selected from the group consisting of methyl acrylate, ethylene (meth)acrylate, propyl acrylate, butyl (meth)acrylate, hexyl acrylate, 2-ethylhexyl acrylate, dodecyl acrylate, lauryl acrylate, stearyl acrylate and mixtures thereof;
ii) between 5 and 50 weight % of a wax having from 6 to 20 carbon atoms;
iii) less than 75 weight % of a filler; and
iv) between 0.1 and 10 weight % of an aliphatic carboxylic acid having from 8 to 32 carbon atoms.

9. The carpet of claim 8, further comprising tufts of yarn secured into the first layer.

10. The multi-layer laminated article of claim 1, wherein said carboxylic acid comprises stearic acid.

11. The carpet of claim 8, wherein said carboxylic acid comprises stearic acid.

12. The multi-layer laminated article of claim 1, wherein the hot melt adhesive composition further comprises a plasticizer.

* * * * *